(12) United States Patent
Quesnel et al.

(10) Patent No.: US 10,229,425 B2
(45) Date of Patent: *Mar. 12, 2019

(54) USER TERMINAL QUEUE WITH HYPERLINK SYSTEM ACCESS

(71) Applicant: HARTFORD FIRE INSURANCE COMPANY, Hartford, CT (US)

(72) Inventors: Brenda R. Quesnel, Broad Brook, CT (US); Benjamin A. Cowles, West Hartford, CT (US); Stephen E. Randall, Avon, CT (US); Mary B. Nasenbenny, La Grange, IL (US)

(73) Assignee: Hartford Fire Insurance Company, Hartford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/601,861

(22) Filed: May 22, 2017

(65) Prior Publication Data

US 2017/0270538 A1    Sep. 21, 2017

Related U.S. Application Data

(63) Continuation of application No. 12/112,683, filed on Apr. 30, 2008, now Pat. No. 9,659,299.

(51) Int. Cl.
    *G06Q 30/02*    (2012.01)
    *G06Q 30/00*    (2012.01)

(52) U.S. Cl.
    CPC .......... *G06Q 30/02* (2013.01); *G06Q 30/016* (2013.01); *G06Q 30/0201* (2013.01); *G06Q 30/0203* (2013.01)

(58) Field of Classification Search
    CPC .................................................... G06Q 30/02
    See application file for complete search history.

(56) References Cited

U.S. PATENT DOCUMENTS 6,236,975 B1    5/2001    Boe et al.
6,411,936 B1    6/2002    Sanders
(Continued)

FOREIGN PATENT DOCUMENTS

WO    2001033831 A2    5/2001

OTHER PUBLICATIONS

Keiningham, Timothy L. et al., The value of different customer satisfaction and loyalty metrics in predicting customer retention, recommendation, and share-of-wallet, Emerald, Managing Service Quality, vol. 17 No. 4, pp. 361-384, 2007, http://www2.owen.vanderbilt.edu/bruce.cooil/documents/publications/msq200- 7.pdf.

(Continued)

*Primary Examiner* — Kurtis Gills
(74) *Attorney, Agent, or Firm* — Howard IP Law Group

(57) ABSTRACT

A computer system includes a computer configured to access files ripe for surveys from a management system, and provide links to the files in the management system to work queues on survey terminals. The system also includes a data acquisition processor for receiving first and second feedback responses. The first feedback response is received by the data acquisition processor for an open claim. The second feedback response is received by the data acquisition processor after it receives the first feedback response. The system is configured to classify the first feedback response in one of two categories, one indicative of attention needed and one indicative of attention not needed, and to route a claim having an attention needed response to a second terminal.

18 Claims, 9 Drawing Sheets

(56) References Cited

U.S. PATENT DOCUMENTS

| | | | |
|---|---|---|---|
| 7,552,063 B1 * | 6/2009 | McEachern | G06Q 30/02 705/3 |
| 7,593,871 B1 | 9/2009 | Mesaros | |
| 7,609,832 B2 | 10/2009 | Kreiner et al. | |
| 7,664,670 B1 | 2/2010 | Weiss | |
| 7,769,624 B1 | 8/2010 | Armentano et al. | |
| 7,962,962 B2 | 6/2011 | Adler et al. | |
| 2002/0002475 A1 | 1/2002 | Freedman et al. | |
| 2002/0035488 A1 | 3/2002 | Aquila et al. | |
| 2004/0064345 A1 | 4/2004 | Ajamian et al. | |
| 2004/0078235 A1 | 4/2004 | Tallal, Jr. | |
| 2004/0249665 A1 | 12/2004 | David | |
| 2005/0100158 A1 | 5/2005 | Kreiner et al. | |
| 2006/0095331 A1 | 5/2006 | O'Malley et al. | |
| 2006/0253316 A1 | 11/2006 | Blackshaw et al. | |
| 2007/0050256 A1 | 3/2007 | Walker et al. | |
| 2007/0061357 A1 | 3/2007 | Jensen | |
| 2007/0226018 A1 | 9/2007 | Gross et al. | |
| 2008/0010131 A1 | 1/2008 | Bridges et al. | |
| 2008/0065471 A1 | 3/2008 | Reynolds et al. | |
| 2008/0126136 A1 | 5/2008 | Nighan | |
| 2008/0189142 A1 | 8/2008 | Brown et al. | |
| 2008/0270218 A1 | 10/2008 | Scott et al. | |
| 2009/0024419 A1 | 1/2009 | McClellan et al. | |
| 2009/0157489 A1 | 6/2009 | Leeman | |
| 2009/0222358 A1 | 9/2009 | Bednarek | |
| 2012/0029946 A1 | 2/2012 | Aquila et al. | |

OTHER PUBLICATIONS

Donaldson, Don H., The Claims Department, "Factors Influencing Customer Loyalty and Retention", At least as early as Apr. 29, 2008, 3 pgs.

"Consumers Stress Importance of Speed Over Settlement Amount in Insurance Claims Resolution, According to Accenture Survey", New York (Business Wire), Apr. 16, 2002, International Communications Research, [Download Mar. 4, 2008], download from Internet, URL: http://www.icrsurvey.com/Study.sub.--aspy?f=Accenture.sub.--claimis.html, 2pgs.

Progressive Insurance Gets Progressive with Net Promoter Score, Oct. 2007, AVAYA, [Download Mar. 4, 2008], Download from Internet, URL: http://www.avaya.com/gcm/master-usa/en-us/newsletter/article/2007-10/article02-insurance . . . , 4pgs.

Merriam-Webster.com, partner, Apr. 2007, https://web.archive.org/web/20070426022340/http://merriam-webster.com/dic- tionary/partner, 1 page.

Feine, Suzy, "Turn customer testimonials into brand megaphones", Feb. 8, 2011, Internet Marketing Tools Blog, 4 pgs.

Inavero, Net Promoter Score, Jul. 2011, Inavero.com, http://web.archive.org/web/20110729025238/http://www.navero.com/products-services/net-promoter-survey/net-promoter score/.

Surveymonkey, The net promoter score, Aug. 4, 2012, surveymonkey.com, http://web.archive.org/web/20120804001932/http://www.surveymonkey.com/mp/net-promoter-score.

Keysurvey.com, "Developing successful customer satisfaction survey", Aug. 2007, https ://web. archive.org/web/20070814184823/http ://www.keysurvey.com/resources/whitepapersfulltext3.jsp.

* cited by examiner

USER TERMINAL QUEUE WITH HYPERLINK SYSTEM ACCESS

CROSS REFERENCE TO RELATED APPLICATIONS

This application is a continuation application of co-pending U.S. patent application Ser. No. 12/112,683 entitled "Computer System and Method for Interim Transaction Diagnosis for Selective Remediation and Customer Loyalty Enhancement" filed on Apr. 30, 2008, the entire contents of which are incorporated herein by reference for all purposes.

FIELD

The present invention relates to computer systems and more particularly to computer systems that are utilized in transaction handling.

BACKGROUND

Marketing experts are coming to recognize that engendering customer loyalty is a crucial ingredient in generating increased profitability. Typical tools for measuring customer loyalty include surveying customers after completion of interaction between customers and company employees. Results of such surveys can be employed to improve employee training and designs of customer service practices. Such improvements may lead to future increases in customer loyalty. However, such surveys are likely to be ineffective in regaining customer loyalty in regard to particular customers who have found their interactions with company employees to be unsatisfactory.

SUMMARY

A system is disclosed for customer feedback acquisition and processing. The system includes a data acquisition processor for receiving first and second customer feedback responses. The first customer feedback response is received by the data acquisition processor after notice of a claim is received and before the claim is resolved. The second customer feedback response is received by the data acquisition processor after receiving the first customer feedback response. The data acquisition processor is operative to classify the first customer feedback response in one of two categories. The two categories are an "attention-needed" category and an "attention-not-needed" category.

The system further includes a workflow router that is in communication with the data acquisition processor, and a supervisor terminal that is in communication with the workflow router. The workflow router is operative to route the claim to the supervisor terminal in response to the first customer feedback response being classified in the "attention-needed" category.

In addition, the system includes a database storage unit in communication with the data acquisition processor for storing data that represents the first and second customer feedback responses. Still further, the system includes a database processor in communication with the database storage unit. The database processor is operative to identify trends in customer feedback response data stored in the database storage unit. Also, the system includes a display device in communication with the database processor. The display device provides a screen display indicative of an aggregation of the customer feedback response data stored in the database storage unit.

By obtaining a customer's response to claim handling performance while the claim is still open, remedial action may be taken when necessary to provide service that the customer considers to be satisfactory, thereby building customer loyalty in cases in which customers might otherwise be disappointed.

With these and other advantages and features of the invention that will become hereinafter apparent, the invention may be more clearly understood by reference to the following detailed description of the invention, the appended claims, and the drawings attached hereto.

DETAILED DESCRIPTION

In general, and for the purposes of introducing concepts of embodiments of the present invention, a computer system is utilized to direct employees to conduct surveys relating both to closed claim files and to claims that have yet to be resolved. Responses to the latter—interim—surveys are evaluated to detect when the open claims are going off-track from the claimant's point of view. Remedial action is triggered through the computer system to rescue the handling of the claim and to secure the claimant's satisfaction and loyalty. Results from one or both types of surveys are screened to detect customers who display loyalty, and in those cases the computer system triggers cross-selling initiatives.

Figure 1:
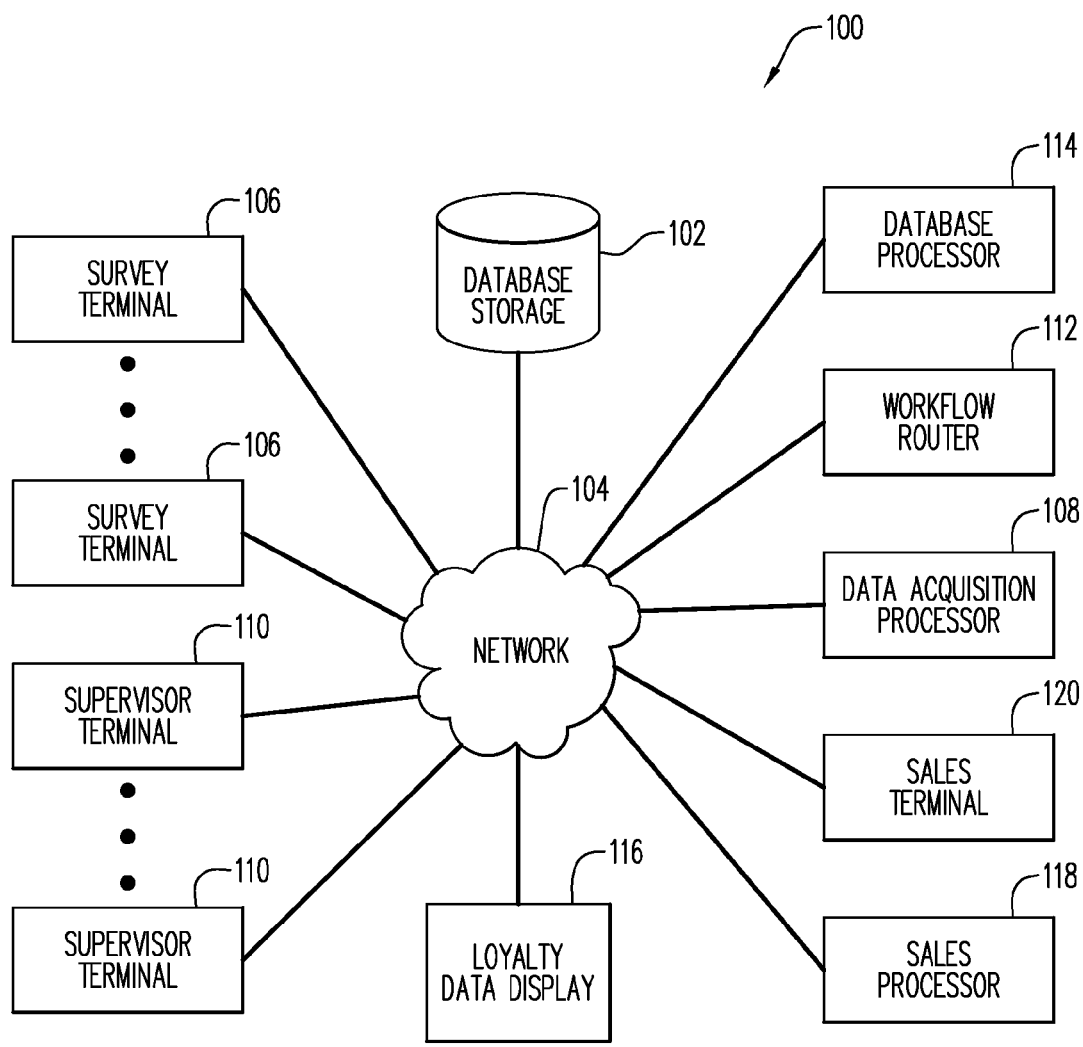
FIG. 1 is a partially functional block diagram that illustrates aspects of a computer system provided in accordance with some embodiments of the invention.

Features of some embodiments of the present invention will now be described by first referring to FIG. 1. FIG. 1 is a partially functional block diagram that illustrates aspects of a computer system 100 provided in accordance with some embodiments of the invention. For present purposes it will be assumed that the computer system 100 is operated by an insurance company (not separately shown) for the purpose of building, gauging and gaining benefits from customer loyalty.

The computer system 100 includes a database storage module 102. In terms of its hardware the data storage module 102 may be conventional, and may be composed, for example, by one or more magnetic hard disk drives. A function performed by the data storage module 102 in the computer system 100 is to receive, store and provide access to files relating to insurance claims. The claims may be from one or more different lines of insurance, such as worker's compensation, property and casualty, automobile, etc. The data storage module 102 may also store data that reflects responses by claimants to the customer satisfaction surveys that are described below. (The customers who are to be surveyed may be policy holders who are making a claim or alternatively may be non-policy-holders such as individuals whose vehicles sustained damage in a collision with insured vehicles. Both groups of individuals will hereinafter sometimes be referred to as "claimants".) Still other data may be stored in the data storage module 102, including for example data that is relevant to providing selling propositions to claimants who have indicated loyalty to the insurance company. Where the claimant is not a policy holder, the selling proposition may be designed to convert the claimant to be a customer. Where the claimant is a policy holder, the selling proposition may be designed to take advantage of a cross-selling opportunity.

The data stored in regard to the customer satisfaction surveys may include recordings of the claimants' voices. Although the data storage module 102 is depicted as a single device in FIG. 1, in practice its functions may be spread among a number of different devices, such as plural server computers which incorporate their own storage capabilities.

The computer system 100 may also include a data communication network 104 to which the data storage module 102 is coupled. The data communication network 104 may for example be conventional in its construction and functionality, and may serve as an "intranet" for the insurance company. In some embodiments the data communication network may also incorporate and/or be connected to a public data communication network (not separately shown) such as the Internet.

The computer system 100 may further include a number of terminals 106 that may be employed by employees of the insurance company who are assigned to conduct customer satisfaction surveys in regard to the company's handling of insurance claims. As will be seen, the terminals 106 (hereinafter referred to as "survey terminals"), may be constituted by conventional personal computers coupled to the data communication network 104. One function that may be performed by the survey terminals 106 is to input data indicative of claimants' responses to interim and final customer satisfaction surveys.

In addition, the computer system 100 may include a data acquisition processor 108 that is also coupled to the data communication network 104. The data acquisition processor 108 may be constituted by one or more conventional microprocessors included in one or more server computers (not separately shown in FIG. 1) that may be programmed to function in accordance with the present invention. The data acquisition processor 108 may function to receive the customer feedback response data from the survey terminals 106 (via the data communication network 104) and to store the customer feedback response data in the database storage module 102. The data acquisition processor may also classify the customer feedback responses as to whether the responses are satisfactory, unsatisfactory, indicative of customer loyalty, etc. (In some embodiments, the responses may be at least partially so classified at the survey terminals 106, in which case the data acquisition processor 108 may be deemed to at least partially overlap with the survey terminals 106.)

Still further, the computer system 100 may include a number of terminals 110 operated by supervisory employees of the insurance company. Like the survey terminals 106, the terminals 110 (hereinafter referred to as "supervisor terminals") may be constituted by conventional personal computers coupled to the data communication network 104. The supervisory employees who operate the supervisor terminals 110 may be charged with supervising claim handlers whose claim files are stored in the data storage module 102.

Moreover, the computer system 100 may include a workflow router 112 that is coupled to the data communication network 104 and thus is in communication, at least from time to time, with the data acquisition processor 108. The workflow router 112 may be constituted by one or more conventional microprocessors that may for example be included in one or more conventional server computers (not separately shown in FIG. 1). For example, the workflow router 112 may at least partially overlap with the data acquisition processor 108. The workflow router may operate to route, to the supervisor terminals 110, claim files determined, from claimants' responses to interim customer satisfaction surveys, to be in need of remedial attention to achieve customer satisfaction. In some embodiments, the workflow router may also operate to capture and record actions taken by supervisors in response to the messages to them that indicate a need for remedial attention.

The computer system 100 may also include a database processor 114 that is coupled to the data communication network 104, and thus is in communication, at least from time to time, with the database storage module 104. The database processor may be constituted by one or more conventional microprocessors that may for example be included in one more conventional server computers (not separately shown in FIG. 1) that may be programmed to function in accordance with the present invention. For example, the database processor 114 may at least partially overlap with the data acquisition processor 108. The database processor 114 may operate to identify and report trends in customer feedback response data stored in the database storage module 104 by the data acquisition processor 108.

Still further, the computer system 100 may include a display device 116 that is coupled to the data communication network 104. Accordingly, the display device 116 may be in communication, at least from time to time, with the database processor 114. As will be appreciated from subsequent discussion, the display device 116 may be employed to provide one or more screen displays concerning customer feedback responses to interim and/or final surveys, including summaries, trends and/or aggregations of customer feedback response data.

In addition, the computer system 100 may include a sales processor 118 that is coupled to the data communication network 104. The sales processor 118 may be in communication, at least from time to time, with the database storage module 102, the data acquisition processor 108 and the workflow router 112. The sales processor may be constituted by one or more conventional processors that may for example be part of one or more conventional server computers (not separately shown) that may be programmed to function in accordance with the present invention.

Also, the computer system 100 may include a sales terminal 120 coupled to the data communication network 104 and thus in communication, at least from time to time, with the workflow router 112. The sales terminal 120 may for example be constituted by a conventional personal computer that may be programmed to function in accordance with the present invention.

As will be understood from subsequent discussion, the data acquisition processor 108 (possibly in conjunction with one or more other components of the computer system 100) may operate to selectively classify customer feedback responses to the final survey as "company-loyal", i.e., as evidencing customer loyalty toward the insurance company that operates the computer system 100. In response to such a classification of a customer feedback response, the sales processor may generate a selling proposition for the customer in question. For example, a selling proposition may include an offer to supply to the customer a policy for a line of insurance that the customer does not currently have in force with the insurance company. The workflow router 112 may operate to route the selling proposition to the sales terminal 120. The sales terminal may be operated by a sales agent or other employee of the insurance company or of an affiliate of the insurance company, such as an independent insurance agent or another insurance company affiliated with the insurance company that operates the computer system 100.

Figure 2:
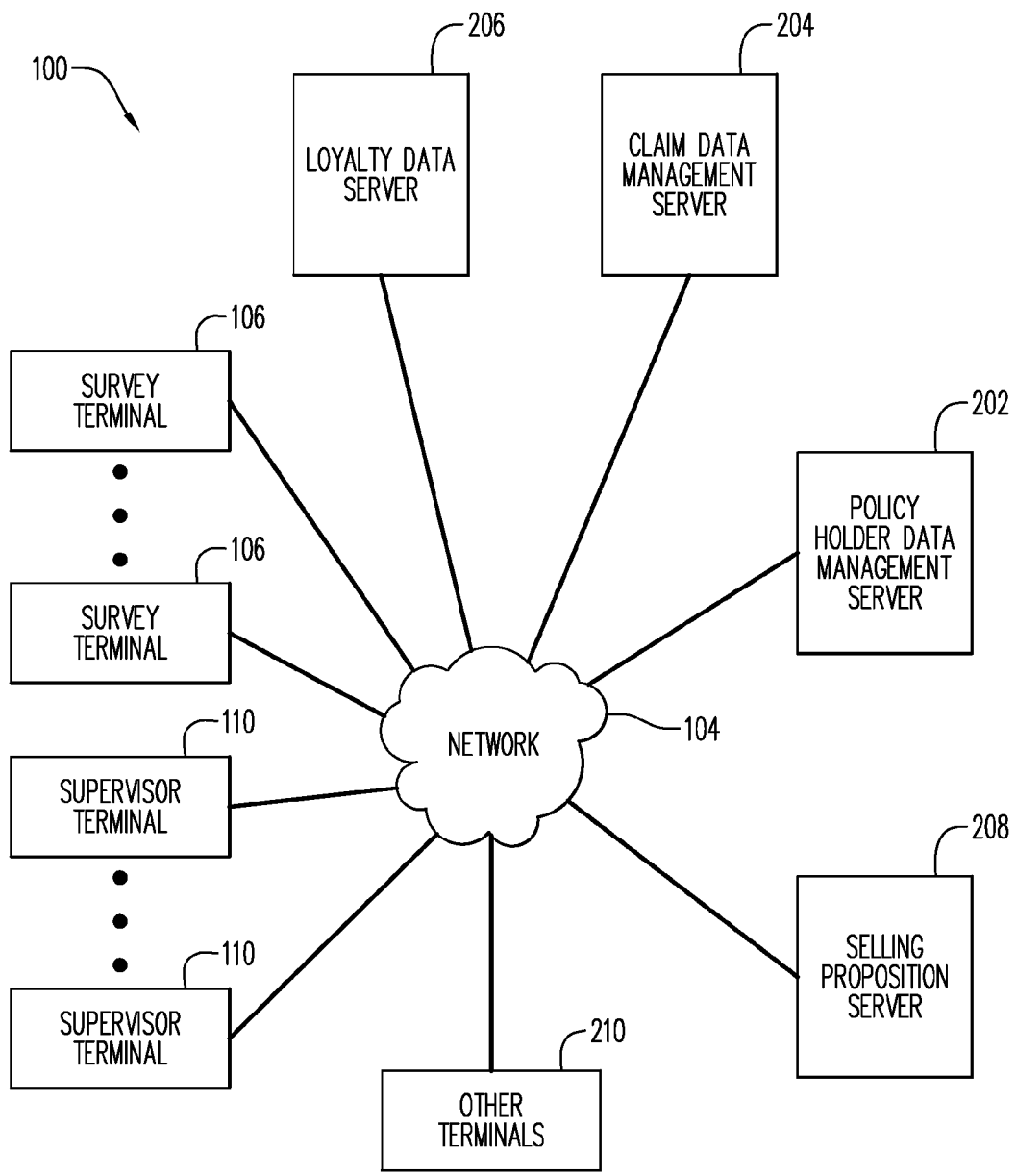
FIG. 2 is a block diagram that provides another representation of aspects of the system of FIG. 1.

In some embodiments, a customer who exhibits loyalty to the insurance company may be asked to consent to the company sending an electronic mail message to friends, family and/or business associates of the customer to present the customer's endorsement of the insurance company and to ask those individuals to become customers of the insurance company. FIG. 2 is a block diagram that provides another representation of aspects of the computer system 100. FIG. 2 shows the same data communication network 104, survey terminals 106 and supervisor terminals 110 that were depicted in, and described in connection with, FIG. 1. FIG. 2 also depicts other components of the computer system 100 in a more hardware-oriented manner than FIG. 1. Thus, other components of the computer system 100 shown in FIG. 2 may constitute components of the system that were functionally depicted in FIG. 1. For example, the computer system 100 may include a policy holder data management server computer 202 and a claim data management server computer 204. The latter two servers may together constitute some or all of the functionality ascribed above to the data storage module 102 shown in FIG. 1. The policy holder data management server computer 202 and the claim data management server computer 204 may both be constituted and operated in a substantially conventional manner. The policy holder data management server computer 202 may store data concerning policies in force with the insurance company, including names, addresses, etc. of policy holders, types and terms of coverage, policy effective dates, coverage amounts, etc. The claim data management server computer 204 may store data concerning claims made against the insurance company, includes names and addresses of claimants, date of loss, and all other information accumulated during investigation and settlement/resolution of the claims.

Other components of the computer system 100 not explicitly depicted in FIG. 1, but shown in FIG. 2, may include a loyalty data server computer 206 and selling proposition server computer 208. Both of the latter server computers are described below. Further, the computer system 100 may include a number of other terminals 210, which may be conventional personal computers operated by various employees of the insurance company and/or its affiliates. Such employees may be, for example, individuals performing line and/or staff management functions, claim handlers, clerical and administrative employees, sales employees, etc. At least some of the other terminals 210 (like the terminals 106, 110) may include a conventional screen display (not separately shown in FIG. 2) for presenting to the user screen displays generated on the terminal in question or downloaded from another component of the computer system 100.

The computer system 100 may include other server computers (e.g., one or more billing servers) in addition to the server computers shown in FIG. 2. The functions ascribed to individual server computers herein may in practice be divided up among two or more different computers. Also, the functions shown or described as being performed in separate computers may in practice be combined within a single computer.

Figure 3:
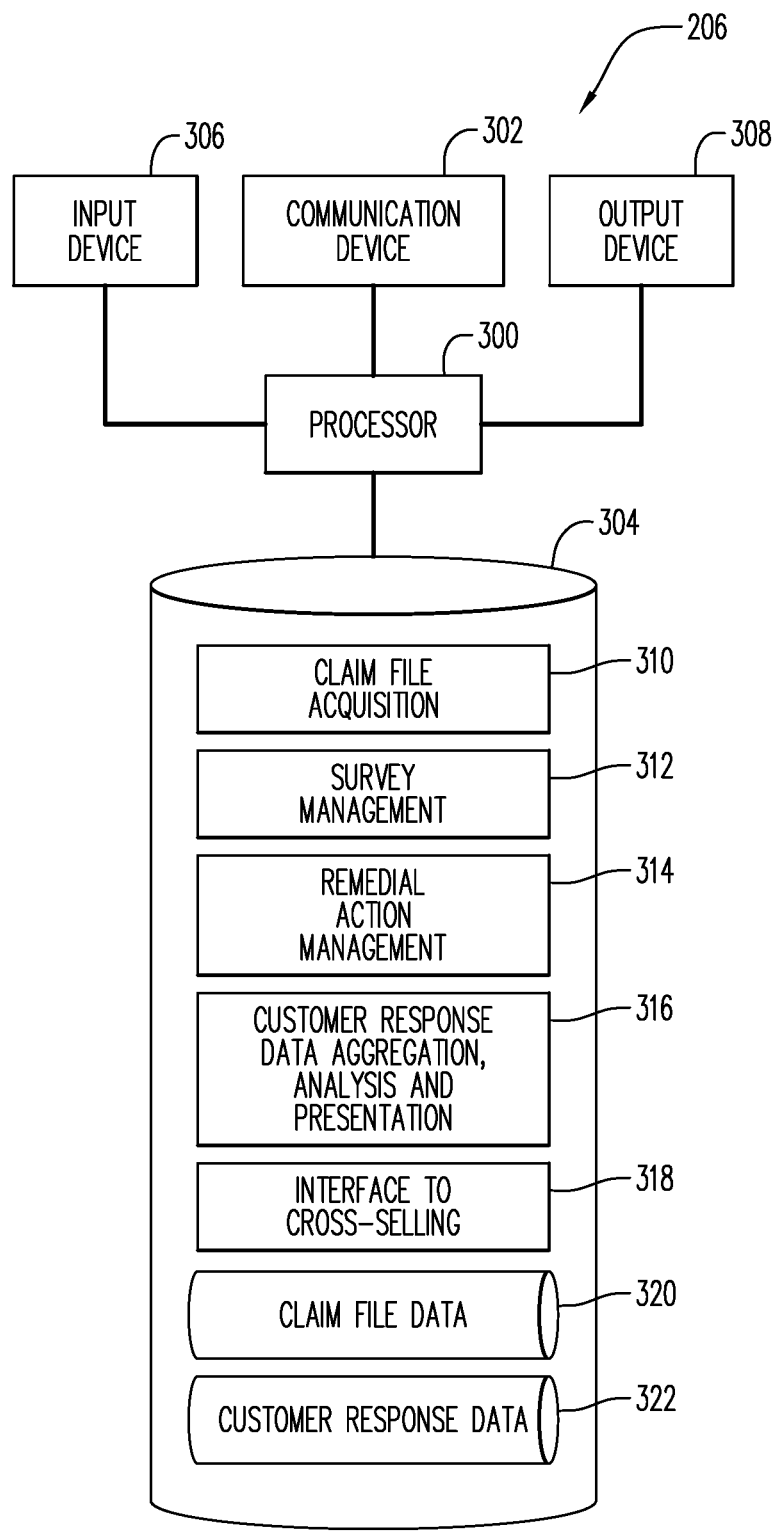
FIG. 3 is a block diagram that illustrates a loyalty data server computer that may form part of the system of FIGS. 1 and 2.

FIG. 3 is a block diagram that illustrates the loyalty data server computer 206. In its hardware aspects the loyalty data server computer 206 may be entirely conventional, but programmed to provide functionality as described herein.

As depicted, the loyalty data server computer 206 includes a computer processor 300 operatively coupled to a communication device 302, a storage device 304, an input device or devices 306 and an output device 308. Communication device 302 may be used to facilitate communication with, for example, other servers/terminals/personal computers coupled to the data communication network 104 (FIG. 1). Continuing to refer 2 to FIG. 3, the input device(s) 306 may comprise, for example, a keyboard, a keypad, a mouse or other pointing device, a microphone, knob or a switch, an infra-red (IR) port, a docking station, and/or a touch screen. The input device(s) 306 may be used, for example, to enter information. Output device 308 may comprise, for example, a display (e.g., a display screen), a speaker, and/or a printer. (Functionally, the terminals 106, 110 and/or 210 shown in FIG. 2 may also serve to output/display information downloaded thereto from the loyalty data server computer 206.)

Storage device 304 may comprise any appropriate information storage device, including combinations of magnetic storage devices (e.g., magnetic tape and hard disk drives), optical storage devices, and/or semiconductor memory devices such as Random Access Memory (RAM) devices and Read Only Memory (ROM) devices.

Storage device 304 stores one or more programs or portions of programs (at least some of which being indicated by blocks 310-318) for controlling processor 300. Processor 300 performs instructions of the programs, and thereby operates in accordance with the present invention. In some embodiments, the programs may include a program or program module 310 that programs the loyalty data server computer 206 to acquire claim files (or excerpts therefrom) for which customer satisfaction surveys are to be performed.

Another program or program module stored on the storage device 304 is indicated at block 312 and is operative to allow the loyalty data server computer 206 to assign and manage administration of the customer satisfaction surveys.

Still another program or program module stored on the storage device 304 is indicated at block 314. Program (or program module) 314 may program the loyalty data server computer 206 to initiate, route and/or manage tasks that are to be performed to perform remedial action with respect to open claim files for which claimants' responses to interim surveys indicate that the claimant is dissatisfied with the handling to date of the claim.

Another program/program module 316 programs the loyalty data server computer 206 to gather, receive, store and analyze data that represents claimants' responses to the interim and final customer satisfaction surveys. Among other functions that the program/program module 316 may cause the loyalty data server computer 206 to perform are aggregation of the claimants' responses and presentation of the aggregated response data to management and/or other employees of the insurance company.

A further program/program module 318 provides an interface between other program functions of the loyalty data server computer 206 and the selling proposition server computer 208 (FIG. 2).

There may also be stored in the storage device 304 other software, such as one or more conventional operating systems, device drivers, communications software, database management software, etc.

Still further, various kinds of data needed for operation of the loyalty data server computer 206 may be stored in the storage device 304, including for example claim file data 320, and customer/claimant response data 322 gathered in response to the above-mentioned surveys.

Figure 4:
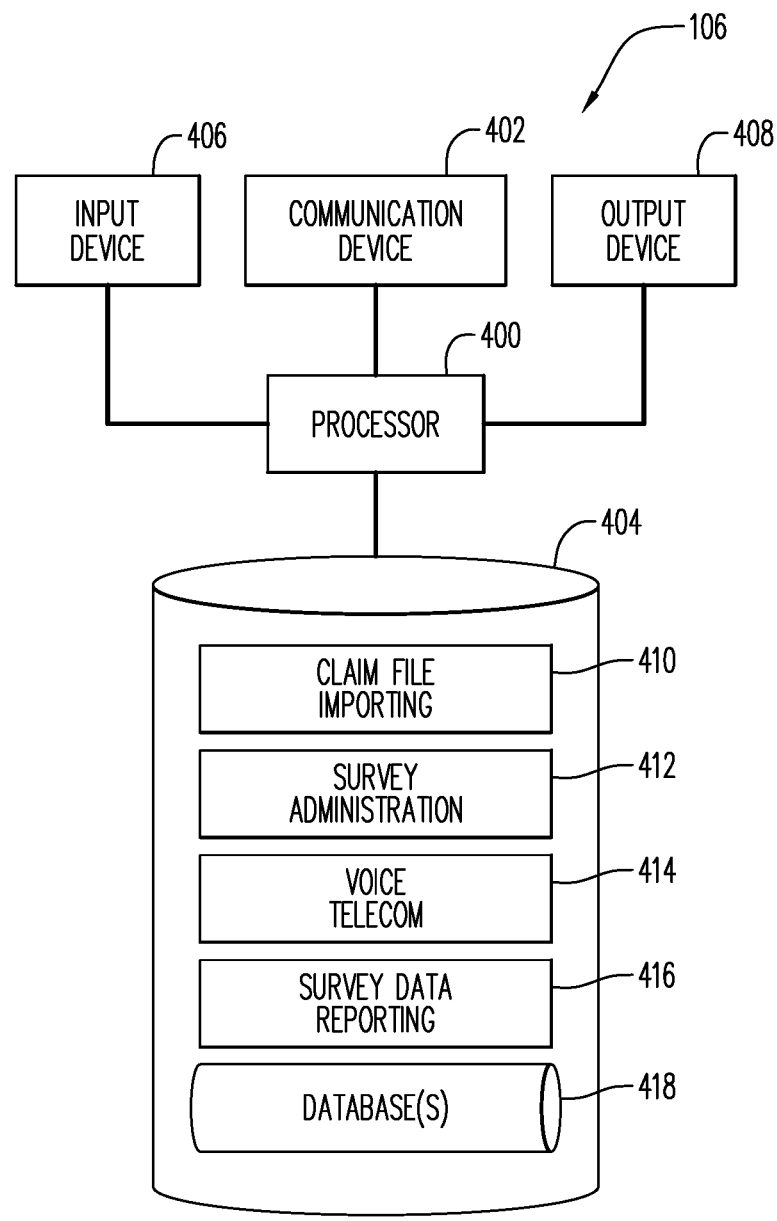
FIG. 4 is a block diagram that illustrates a personal computer that may be employed as a terminal for a survey employee in the system of FIGS. 1 and 2.

FIG. 4 is a block diagram that illustrates a typical one of the survey terminals 106 shown in FIGS. 1 and 2. In its hardware aspects, the survey terminal 106 may be entirely conventional, but may be programmed and/or may download interactive webpages so as to function in accordance with aspects of the present invention.

As depicted, the survey terminal 106 includes a computer processor 400 operatively coupled to a communication device 402, a storage device 404, an input device or devices 406 and an output device or devices 408. Communication device 402 may be used to facilitate communication with, for example, servers (e.g., the loyalty data server computer 206) and/or other terminals/personal computers coupled to the data communication network 104 (FIG. 1). Continuing to refer to FIG. 4, the input device(s) 406 may comprise, for example, a keyboard, a keypad, a mouse or other pointing device, a microphone, knob or a switch, an infra-red (IR) port, a docking station, and/or a touch screen. The input device(s) 406 may be used, for example, to enter information. Output device 408 may comprise, for example, a display (e.g., a display screen), a speaker, and/or a printer. In some preferred embodiments, the output device(s) 408 and the input device(s) 406 may collectively include a telephone handset and/or headset and/or speakerphone arrangement by which the user of the survey terminal 106 may engage in telephone conversations with claimants to whom the user administers customer satisfaction surveys. Data representing the telephone conversations (including either or both of the user's (survey employee's) voice and the claimant's voice) may pass through the survey terminal 106 as part of the voice communication channel between the survey employee and the claimant. At the same time, at least some of the voice data, including possibly the claimant's voice, may be stored in the storage device 404 for subsequent uploading to the loyalty data server computer 206.

Storage device 404 may comprise any appropriate information storage device, including combinations of magnetic storage devices (e.g., magnetic tape and hard disk drives), optical storage devices, and/or semiconductor memory devices such as Random Access Memory (RAM) devices and Read Only Memory (ROM) devices.

Storage device 404 stores one or more programs or portions of programs (at least some of which being indicated by blocks 410-416) for controlling processor 400. Processor 400 performs instructions of the programs, and thereby operates in accordance with the present invention. In some embodiments, the programs may include a program or program module 410 that programs the survey terminal 106 to acquire (e.g., from the loyalty data server computer 206) claim files (or excerpts therefrom) for which customer satisfaction surveys are to be performed. In some embodiments, the program/program module 410 may be at least partially constituted by a browser program by which the user may access the user's work queue (stored, e.g., on the loyalty data server computer 206) and may access the individual claim files/file extracts by clicking on individual items in the user's work queue.

Another program or program module stored on the storage device 404 is indicated at block 412 and is operative to cause the survey terminal 106 to guide/prompt the user in administering the customer satisfaction surveys.

Still another program or program module stored on the storage device 404 is indicated at block 314. Program (or program module) 414 may control the survey terminal 106 so as to enable operation of the above-mentioned telephone terminal equipment that may be part of the survey terminal 106. In addition, or alternatively, the survey terminal 106 may include a dedicated voice/telecom card (not separately shown) which effectively couples the telephone terminal equipment to the processor 400 and drives/receives voice signals from the telephone terminal equipment.

Another program/program module 316 programs the survey terminal 106 to receive, store, and forward to the loyalty data server computer 206, data that represents claimants' responses to the interim and final customer satisfaction surveys.

There may also be stored in the storage device 404 other software, such as one or more conventional operating systems, device drivers, communications software, database management software, etc. Still further, various kinds of data needed for operation of the survey terminal 106 may be stored in the storage device 404, as indicated at 418 in FIG. 4.

Figure 5:
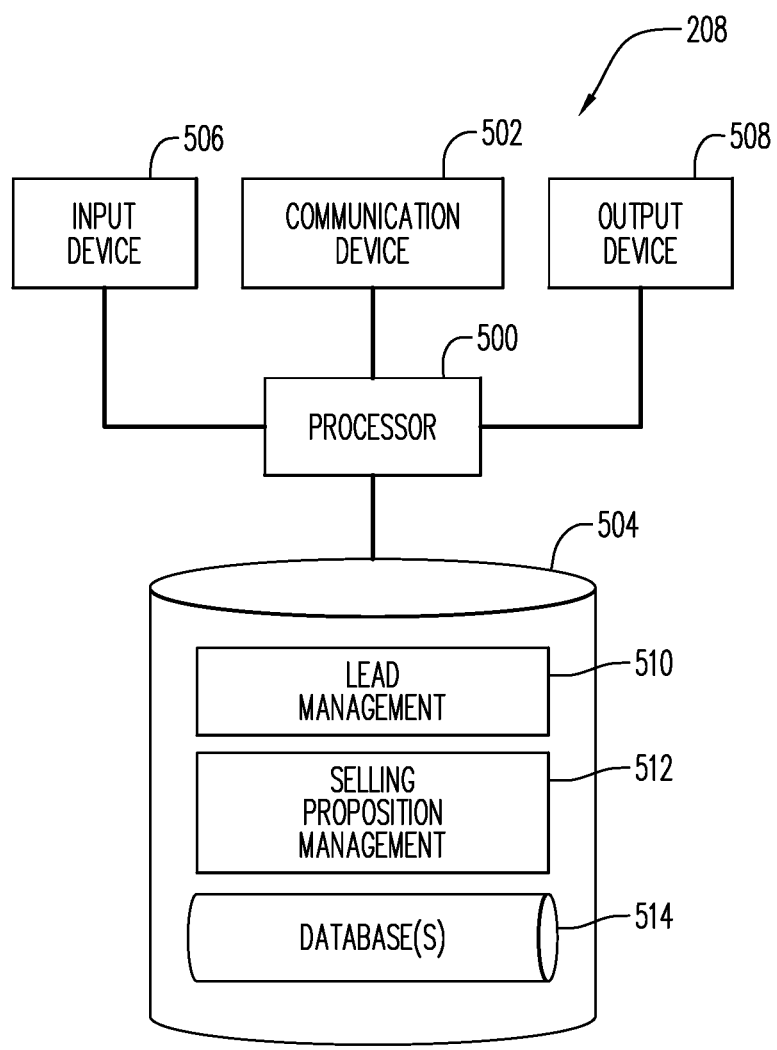
FIG. 5 is a block diagram that illustrates a selling proposition server computer that may form part of the system of FIGS. 1 and 2.

FIG. 5 is a block diagram that illustrates the selling proposition server computer 208. Once again, the hardware aspects of this component may be entirely conventional, but the component may be programmed so as to perform functions in accordance with aspects of the present invention.

As depicted, the selling proposition server computer 208 includes a computer processor 500 operatively coupled to a communication device 502, a storage device 504, an input device or devices 506 and an output device 508. Communication device 502 may be used to facilitate communication with, for example, other servers/terminals/personal computers coupled to the data communication network 104 (FIG. 1). Continuing to refer to FIG. 5, the input device(s) 506 may comprise, for example, a keyboard, a keypad, a mouse or other pointing device, a microphone, knob or a switch, an infra-red (IR) port, a docking station, and/or a touch screen. The input device(s) 506 may be used, for example, to enter information. Output device 508 may comprise, for example, a display (e.g., a display screen), a speaker, and/or a printer. (Functionally, the terminals 210 shown in FIG. 2—including e.g. one or more of such terminals functioning as a sales terminal 120 as shown in FIG. 1—may also serve to output/display information downloaded thereto from the selling proposition server computer 208.)

Storage device 504 may comprise any appropriate information storage device, including combinations of magnetic storage devices (e.g., magnetic tape and hard disk drives), optical storage devices, and/or semiconductor memory devices such as Random Access Memory (RAM) devices and Read Only Memory (ROM) devices.

Storage device 504 stores one or more programs or portions of programs (at least some of which being indicated by blocks 510, 512) for controlling processor 500. Processor 500 performs instructions of the programs, and thereby operates in accordance with the present invention. In some embodiments, the programs may include a program or program module 510 that programs selling proposition server computer 208 to receive, from the loyalty data server computer 206, data that identifies and/or provides contact information for claimants whose survey responses indicate that they are at least potentially loyal to the insurance company. The selling proposition server computer 208 may treat this information as constituting sales leads, and may manage it accordingly, under control by the program/program module 510.

Another program or program module stored on the storage device 504 is indicated at block 512 and is operative to program the selling proposition server computer 208 to generate and manage targeted selling propositions suitable for the individuals identified by the sales leads forwarded to the selling proposition server computer 208 from the loyalty data server computer 206.

There may also be stored in the storage device 504 other software, such as one or more conventional operating systems, device drivers, communications software, database management software, etc. Still further, various kinds of data needed for operation of the selling proposition server computer 208 may be stored in the storage device 504, as indicated at 514 in FIG. 5.

Figure 6:
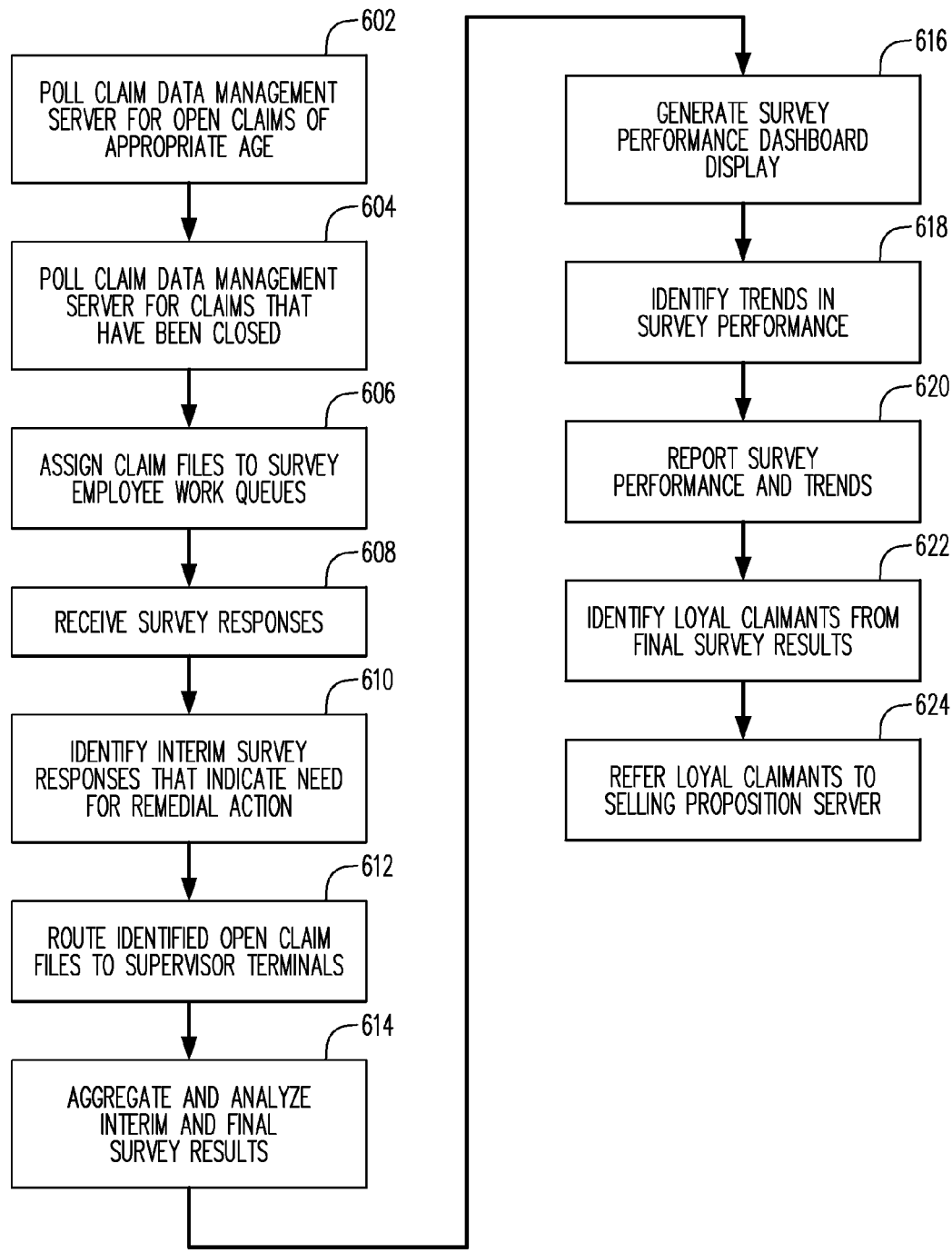
FIG. 6 is a flow chart that illustrates a process that may be performed by the loyalty data server computer of FIG. 3.

FIG. 6 is a flow chart that illustrates a process that may be performed by the loyalty data server computer 206.

At 602 in FIG. 6, the loyalty data server computer 206 makes contact with the claim data management server computer 204 to determine whether there are open claim files that are currently suitable for administering interim customer satisfaction surveys to the claimants that correspond to the files. For example, the loyalty data server computer 206 may learn from the claim data management server computer 204 what claim files have been open for a certain number of days and have not yet been closed/resolved. In some embodiments, the point in time at which a claim file is deemed "ripe" for an interim survey may vary with the type of claim. For example, a worker's compensation case may be ripe for an interim survey a different number of days after first notice of loss (FNOL) than an automobile damage claim. Similarly, a property damage claim may be ripe for an interim survey at still a different number of days after FNOL. In some embodiments, and/or for certain types of claims, an interim survey may preferably be performed 5, 10 or 15 days after FNOL. The number of days may vary with type of claim because the timing of activity may vary with type of claim.

In some embodiments, open claims of a suitable age (=days since FNOL) may be randomly selected for interim survey from the universe of such claims. In some embodiments, some open claims may be disqualified from interim survey by certain factors; e.g., claims involving a fatality or litigation may be disqualified. In some embodiments, all qualified open claims may be interim surveyed.

Step 602 may also include the loyalty data server computer 206 obtaining the pertinent claim files or file extracts, or hyperlinks pointing to the same, from the claim data management server computer 204.

At 604, the loyalty data server computer 206 makes contact with the claim data management server computer 204 to determine whether there are files eligible for a subsequent (potentially, final) customer satisfaction survey. This step may also include the loyalty data server computer 206 obtaining the pertinent claim files or file extracts, or hyperlinks pointing to them, from the claim data management server computer 204. The subsequent survey may be triggered by a certain event, which may vary with type of claim. For example, for a property damage claim, the subsequent survey may be triggered by closing of the claim file or payment of the claim. In some cases, a subsequent survey may be triggered by subrogation. For a worker's compensation claim, the subsequent survey may be triggered at a set time (e.g., 120 days after FNOL) or upon transition to handling of the file by a nurse claim manager.

In some embodiments, there may be more than one subsequent survey, and thus a total of three or more surveys for the claim. In some embodiments, surveys may be initiated on an ad hoc basis. For example, in the case of a catastrophic loss event, some or all claimants may be surveyed to evaluate how well the insurance company has responded to the catastrophic event.

In some cases, a pattern in the responses to one survey may suggest a need or advantage for an additional survey to gain more information concerning issues raised by the survey responses. At 606, the loyalty data server computer 206 assigns either or both open claim files (for interim customer satisfaction surveys) or closed claim files (for final customer satisfaction surveys) among the survey employees available to perform such surveys. In some embodiments, the assignment of claim files to survey employees is entirely random. In other embodiments, the assignment of claim files to survey employees is partially random, but also reflects the survey employees' experience with respect to type of claim, line of insurance and/or with respect to conducting interim versus final customer satisfaction surveys. In some embodiments, assignments of closed claim files are preferably or mandatorily made to the same survey employee who conducted an interim customer satisfaction survey (if any) for the closed claim file in question. In other embodiments, it is preferred or mandatory that the survey employee assigned to administer the final customer satisfaction survey not be the same individual who conducted an interim survey for the claim.

In some embodiments, assignment of a claim file (either open or closed, as the case may be) to a survey employee may be accomplished by the loyalty data server computer 206 placing a corresponding hyperlink in the survey employee's work queue. Alternatively, the loyalty data server computer 206 may effect assignment of the claim file to the survey employee by sending to the survey employee an electronic mail message which contains such a hyperlink. Either of these actions may be considered to constitute "routing" the claim file to the survey employee and/or to his/her survey terminal 106.

In assigning the claim files, the loyalty data server computer 206 may append or link thereto the appropriate survey script for guiding the survey employee in conducting the desired customer satisfaction survey. In the case of an open claim file, the appended survey script may be suitable for conducting an interim customer satisfaction survey. In the case of a closed/resolved claim file, the appended survey script may be suitable for conducting a final customer satisfaction survey. In either case, the survey script may be tailored as appropriate to the type of claim and/or to details of the particular claim or attributes of the claimant. Examples of survey scripts will be described below in conjunction with the process illustrated in FIG. 8.

Continuing to refer to FIG. 6, at 608 the loyalty data server computer 206 may receive, from the survey terminals 106, data that reflects the claimants' responses to the interim and final customer satisfaction surveys. In some embodiments, this data may include entries made by the survey employees to characterize the claimants' responses as requiring further attention ("attention-needed") or not requiring further attention ("attention-not-needed"). In some embodiments, the responses, whether explicitly stated by the claimants or characterized by the survey employees, may be on a numerical scale from best to worst (or vice versa). In some embodiments, the data received by the loyalty data server computer 206 from the survey terminals 106 may include data that represents recordings of claimants' voices and/or survey employees' voices recorded during the course of the surveys. In some embodiments, the customer's response to a "scale of 1-10" satisfaction question may be used to categorize the customer as "loyal", "passive", or potentially a "detractor". Responses to further questions, or reasons given by the customer for his/her satisfaction rating, may be used to assign the customer to a more detailed category or subcategory. Voice recognition and/or machine text analysis may be used for this purpose, or the survey employee may make the categorization/subcategorization of the customer. Either the satisfaction rating alone, or details of the customer's response, or a question asked by the customer, may lead to the claim file being flagged as "attention-needed".

At 610, and based on claimants' responses to interim surveys, the loyalty data server computer 206 identifies open claim files for which remedial action should be taken. That is, the loyalty data server computer 206 identifies open claim files for which the claimants' responses indicated that the claimants were not satisfied with the manner in which the insurance company was handling their claims. Then, at 612, the loyalty data server computer 206 routes each such open claim files to the supervisor terminal 110 operated by the supervisor of the claim handler to whom the claim file was assigned for processing. In some embodiments, the supervisor in question for the open claim file, and/or a network address for his/her supervisor terminal 110, and/or the supervisor's e-mail address may be included in the open claim file or extract that the loyalty data server computer 206 obtained for the claim in question from the claim data management server computer 204. In other embodiments, or other cases, the loyalty data server computer 1206 obtains the identity/network address of the supervisor from the claim data management server computer 204 after identifying the open claim file as being in need of remedial action.

In some embodiments, step 612 may be accomplished by the loyalty data server computer 206 sending an appropriate electronic mail message to the supervisor. In other embodiments, the same may be accomplished by the loyalty data server computer 206 adding an item concerning the claim file to the supervisor's work queue. Either of these may include making available to the supervisor a hyperlink that points to the claim file.

In some embodiments, the responses to the customer satisfaction surveys may also be used in appraising claim handlers' job performance. At 614, the loyalty data server computer 206 collates the customer responses to the surveys. For example, the loyalty data server computer 206 may aggregate all interim survey responses that fall in the same category with respect to the degree of customer satisfaction with the handling of the claim. The aggregation of the responses may be on a question-by-question and/or claim-by-claim basis. The same may be done with respect to final survey responses. The response data for interim and final surveys may, but need not, be combined.

Figure 7:
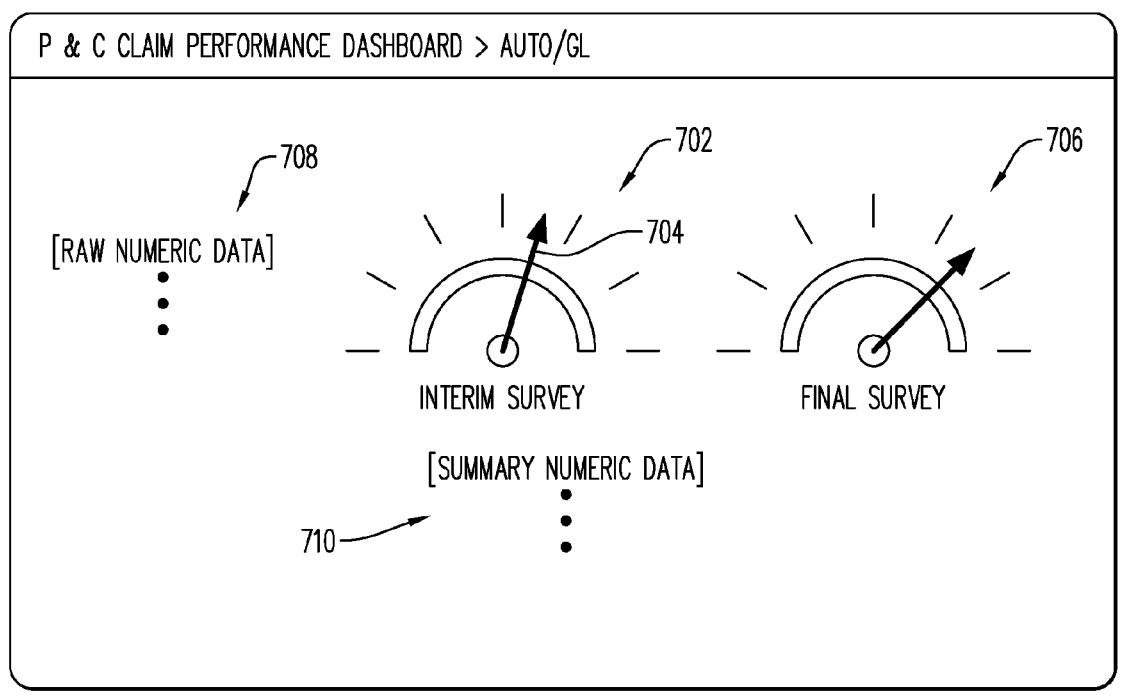
FIG. 7 shows a "dashboard" screen display that may be provided by the loyalty data server computer of FIG. 3.

At 614, the loyalty data server computer 206 may also perform various statistical analyses with respect to the survey response data. For example, the loyalty data server computer 206 may generate analyses which trace trends (step 618) in the survey response data, and/or which aggregate the survey response data by period of time (e.g., daily, weekly, monthly, quarterly and/or annually), by claim-handling office, by individual claim handler, by work group, etc., by type of claim, by line of insurance, etc. Other analyses may provide averages of customer satisfaction ratings, standard deviations, etc. Based, for example, on these analyses and/or aggregations, the loyalty data server computer 206 may generate (step 616) and make available to some or all insurance company employees (via the computer system 100 and/or terminal components thereof, as referred to above) one or more graphical displays that reflect the data, the aggregations thereof and/or the analyses thereof. FIG. 7 shows an example of one such display, provided in a so-called "dashboard" format.

Referring to FIG. 7, one display element 702 is in a "dial" format, and illustrates an average customer satisfaction level indicated by customer responses to interim surveys for a certain type of claim. It will be noted that the dial display element 702 includes an "arrow" element 704 that is displayed against a backdrop of circularly arranged gradations to graphically present the average customer satisfaction data.

The dashboard display of FIG. 7 also includes another display element 706, which is also a "dial" type element in the same format as display element 702. Dial display element 706 may be used to present an average customer satisfaction level indicated by customer responses to final surveys for the same type of claim.

Other portions of the dashboard display, schematically represented at 708 and 710 may numerically present data or results of data analyses, collated or generated by the loyalty data server computer 206.

The format of the customer survey response display or displays made available by the loyalty data server computer 206 may vary from that which is shown in FIG. 7. For example, other and/or additional types of graphical elements may be presented and/or the arrangement of the various elements within the screen display may be different. An over-all presentation in a format other than a "dashboard" may be provided.

In some embodiments, the loyalty data server computer 206 may generate a separate dashboard display for each type of claim. In addition or alternatively, the loyalty data server computer 206 may generate two or more dashboard displays—each displaying different results of statistical analysis of survey responses—for a single type of claim. In some embodiments, the loyalty data server computer 206 may provide a navigation screen display (not shown) to allow users to navigate among various dashboard displays of survey results.

In some embodiments, a dashboard display may also be a navigation tool. For example, a user may be permitted to "double click" on a display element (e.g., a dial display) in the dashboard display, and in response the computer system 100 may provide another display (not shown) showing a breakdown of information summarized in the display element. In this way, the user may be permitted to "drill down" into the customer satisfaction data generated in the computer system 100.

The loyalty data server computer 206 may also analyze survey responses to determine effects of remedial action following negative responses to interim surveys. For example, the loyalty data server computer 206 may examine final survey results for claim files in which remedial action followed a negative response to an interim survey, in order to determine whether and/or to what extent the remedial action resulted in improved customer satisfaction and/or customer loyalty.

Further, as indicated at 620 in FIG. 6, the loyalty data server computer 206 may generate and make available various reports. These reports may reflect the claim handling performance and trends therein as indicated by the customer survey response data. The reports may be in pre-determined formats, or in formats prescribed on demand by authorized employees. The reports may summarize all available customer response data or may present subsets of the customer response data by type of claim, line of business, geographical area, etc.

At 622 in FIG. 6, the loyalty data server computer 206 may identify claimants who, by their responses to the final surveys, have evidenced a feeling of loyalty toward the insurance company that operates the computer system 100. This may be done, for example, on the basis of the claimants indicating a high degree of satisfaction with the handling of their claim, and/or based on the claimants indicating that they would recommend the insurance company to friends, relatives, business associates, etc. In addition or alternatively, the loyalty data server computer 206 may identify loyal claimants on the basis of their responses to interim surveys. The claimants may or may not be current policy holders with the insurance company.

At 624, the loyalty data server computer 206 may forward, to the selling proposition server computer 208, data that identifies the loyal claimants referred to in connection with step 622.

Figure 8:
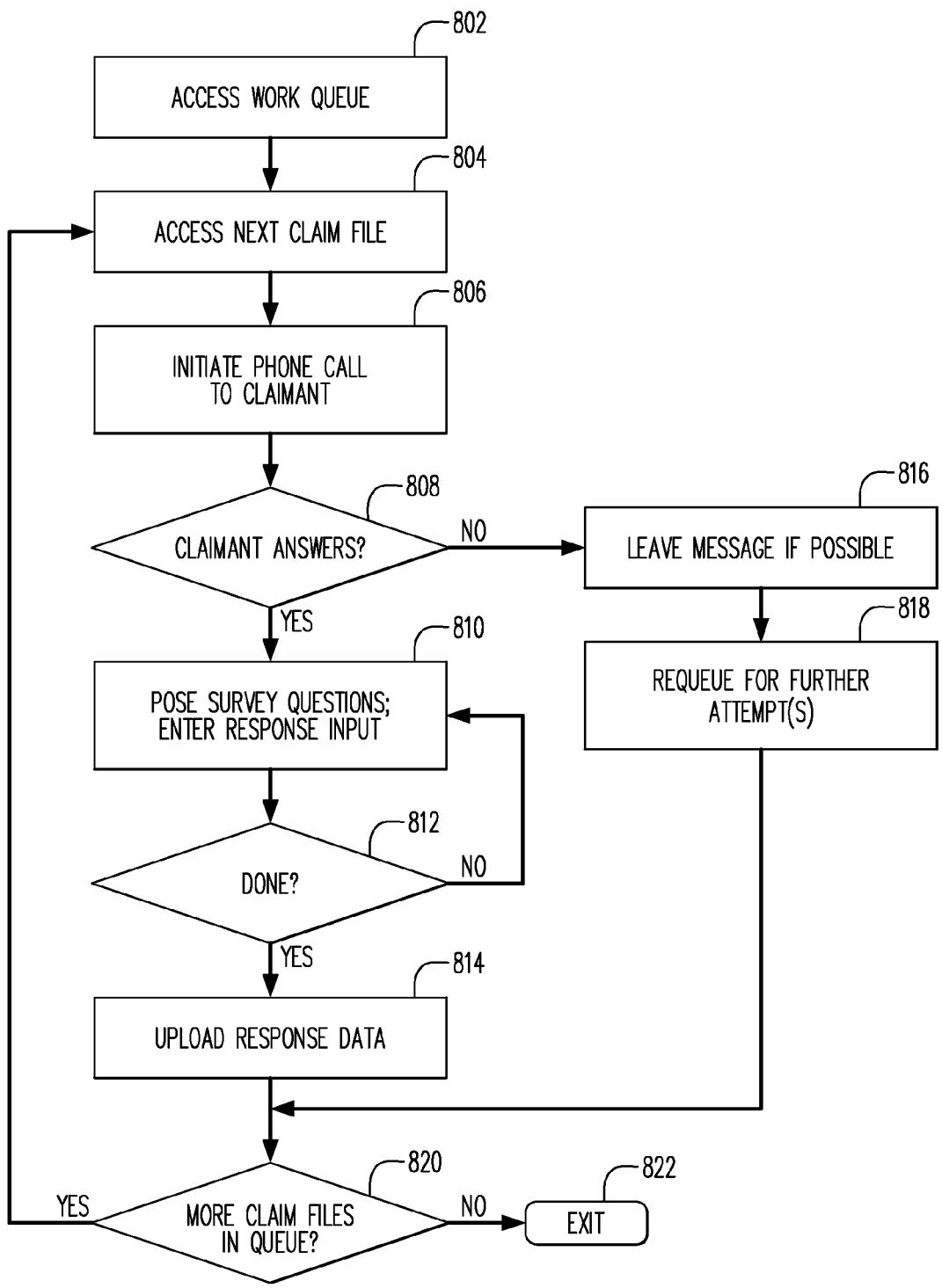
FIG. 8 is a flow chart that illustrates a process that may be performed by the survey employee terminal of FIG. 4.

FIG. 8 is a flow chart that illustrates a process that may be performed by/with a typical one of the survey terminals 106.

At 802 in FIG. 8, the survey employee operates his/her survey terminal 106 to access his/her work queue. At 804, the survey employee operates the survey terminal 106 to access the next/first claim file in the work queue. This may occur, for example, by the survey employee "clicking" on the first entry in the work queue, assuming that the first entry is a hyperlink that points to the claim file (or extract) in question.

At 806 in FIG. 8, the survey employee may use the survey terminal 106 to initiate a telephone call to the claimant for the claim file accessed at 804. For example, the accessed claim file, or extract, may include the claimant's telephone number in a pre-determined data field. The survey terminal 106 may present a graphical user interface (GUI; not shown) to the survey employee. The GUI may include a virtual "start call" button or the like that the survey employee may "click" in order to launch a telephone call via the survey terminal 106 to the claimant's telephone number.

Following 806 in the process of FIG. 8, there is a decision block 808. At decision block 808, it is determined whether the claimant answers the telephone call placed at 806. If so, then block 810 follows decision block 808. At 810, with the claimant's consent, the survey employee proceeds to pose the survey questions to the claimant. In some embodiments, prior to posing the questions, the survey employee obtains the claimant's consent to have his/her voice recorded as part of the survey.

From previous discussion it will be understood that the survey may be an "interim" survey to be administered while the claim remains open, or a "final" survey to be administered after the claim has been resolved.

In some embodiments, the interim survey may be quite brief. For example, the initial question may be open-ended, such as asking the claimant how his/her over-all claim experience is going so far. The survey employee may judge whether the claimant's response is positive, neutral or negative and may ask different follow-up questions accordingly. The survey employee may also interact with the survey terminal GUI to provide input to the survey terminal 106 (and thereby to the computer system 100) as to whether the claimant's response to the initial question is positive, neutral or negative.

In the case of a positive response to the initial question, the survey employee may follow up by asking the claimant whether there was something specific that made the claimant feel positive about the claim experience. In some embodiments, the survey employee may determine a category for the claimant's response to the follow-up question (e.g., among categories presented to the survey employee via the survey terminal GUI) and may provide data entry accordingly into the GUI.

In the case of a neutral response, the survey employee's follow-up question may ask the claimant if there is something that the insurance company could do differently to provide better service. Depending on the claimant's response, the survey employee may operate the survey terminal 106 flag the claim file for remedial action. In addition or alternatively, the survey employee may provide data entry into the survey terminal 106 to indicate a category for the claimant's response to the follow-up question, and/or may provide a text/narrative description of the claimant's response.

In the case of a negative response from the claimant, the survey employee may acknowledge the claimant's dissatisfaction, and may follow up by asking if there is something specific that the insurance company could do better to improve its service to the claimant. Preferably, the survey employee would operate the survey terminal 106 to flag the claim file for remedial action. Alternatively, the claim file may automatically be flagged for remedial action simply by the survey employee indicating that the claimant's response to the initial question was negative. In addition, the survey employee may operate the survey terminal 106 to provide text/narrative/categorization or other data entry in order to input the claimant's response into the survey terminal 106.

The interim survey may close with two more questions, namely asking the claimant to rate his/her experience on a scale of 0-10, and asking for the claimant's e-mail address (if not already in the claim file). In either or both cases the survey employee may enter the claimant's response into the survey terminal 106. The survey employee may also ask the claimant whether he/she would be willing to be contacted for a subsequent survey at a later stage in the claim process.

A final survey script may also be rather brief. The final survey may begin with the survey employee asking the claimant to rate, on a scale of 0-10, how likely it is, based on the claimant's experience with the recently closed claim, that the claimant would recommend the insurance company to a friend or relative or business associate. In other questions, the survey employee may ask the claimant what he/she would tell other people about the insurance company, and/or may ask about specific aspects of handling the type of claim in question. Also, in cases where the claimant is not currently a policy holder, the survey employee may ask the claimant to rate, on a scale of 0-10, how likely the claimant is to consider buying insurance coverage from the insurance company.

With respect to all of these questions, the survey employee may operate the survey terminal 106 to enter data that reflects the claimant's responses.

Where either of the rating questions elicits a high score from the claimant, the computer system 100 (e.g., via the loyalty data server computer 206) may classify the claimant as evidencing loyalty to the insurance company, and thus suitable for generation of a selling proposition from the selling proposition server computer 208.

With respect to either or both of the interim survey and the final survey, step 810 may include recording at least part of the telephone call, including either or both of the claimant's voice and the survey employee's voice.

For both the interim and final surveys, the survey design may be such that the survey can typically be completed in two to three minutes.

Decision block 812 in FIG. 8 indicates that the survey employee continues with the survey until it is determined that the survey is complete. Thus, if the survey is not complete, the process loops back from decision block 812 to block 810. But once the survey is determined to be complete, the process of FIG. 8 advances from decision block 812 to block 814. At block 814, the survey terminal uploads the data representing the survey responses to the loyalty data server computer 206. (Alternatively, this may later be done in a batch mode with data for the surveys for other claim files.) The uploaded data may include both the information entered by the survey employee and also data that represents the sound recording of the survey telephone call.

Considering again decision block 808 in FIG. 8, if it is determined at that point that the claimant has not answered, then the process of FIG. 8 may branch from decision block 808 to block 816. At block 816, the survey employee may, if possible, leave a voice message for the claimant. For example, the survey employee may indicate in the message that he/she will attempt at a later time to contact the claimant, or ask the claimant to call back, or ask the claimant to send an electronic mail message as to when to call again. Further, at 818, the survey employee (or the survey terminal acting automatically) may requeue the claim file for one or more further attempts to reach the claimant by telephone. In some embodiments, the number of permissible attempts to reach the claimant may be limited, and the number of attempts made may be kept track of, so that the claim file is not requeued when the limited number of attempts has been reached.

Following either 818 or 814, as the case may be, is a decision block 820. At 820 it is determined whether there are any more claim files in the survey employees' work queue. If not, the process exits (822). Otherwise, the process loops back from decision block 820 to block 804 for the purpose of accessing the next claim file in the work queue.

Figure 9:
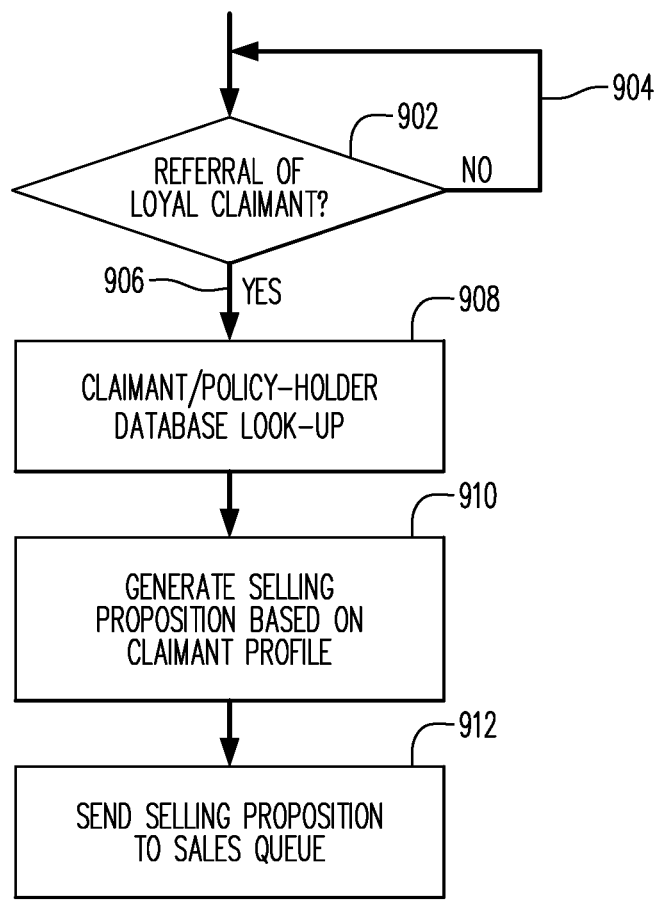
FIG. 9 is a flow chart that illustrates a process that may be performed by the selling proposition server computer of FIG. 5.

FIG. 9 is a flow chart that illustrates a process that may be performed by the selling proposition server computer 208.

At 902 in FIG. 9, the selling proposition server computer 208 determines whether it has received, from the loyalty data server computer 206, a referral of a loyal or potentially loyal claimant, as identified through the final survey process described above. The referrals of such claimants to the selling proposition server computer 208 from the loyalty data server computer 206 may be made one-by-one as the loyal claimants are identified and/or in batches.

As indicated by branch 904 from decision block 902, the process of FIG. 9 may idle until such a referral is received by the selling proposition server computer 208. However, as indicated by branch 906 from decision block 902, when such a referral is received, the process of FIG. 9 may advance from decision block 902 to block 908.

At block 908, and based on the information included in the referral that identifies the claimant, the selling proposition server computer 208 may engage in a data look-up via, e.g., the policy holder data management server computer 202 and/or via the claim data management server computer 204, to obtain more information about the claimant who has been identified as loyal. From the data look-up, the selling proposition server computer 208 may obtain information concerning the claimant such as whether the claimant already is a policy holder (although this fact may alternatively be included already in the referral) and if so under what kind or kinds of policies, for how long, with what specific insurance products, with what policy limits, etc. Further, the selling proposition server computer 208 may obtain by the data look-up at least some demographic information concerning the claimant, including for example his/her age, gender, home address zip code, whether he/she lives in a single family residence or a multiple unit building, income level, marital status, composition of household, types of vehicles insured (if any), employment status, etc.

At block 910, and based on information obtained by the selling proposition server computer 208 at 908, the selling proposition server computer 208 may generate a selling proposition for the claimant. The selling proposition may include one or more insurance policies or additional policies that the insurance company may wish to offer to the claimant, in view of the claimant's demographic attributes, other insurance coverages, history with the insurance company, etc. The selling proposition server computer 208 may generate the selling proposition in accordance with decision rules that have been pre-programmed into the selling proposition server computer 208.

At block 912, the selling proposition server computer 208 may route the selling proposition to the work queue of a sales employee of the insurance company or with an affiliate of the insurance company. Thus the selling proposition may be routed to a sales terminal 120 (FIG. 1) or otherwise brought to the attention of the sales employee. The sales employee may, in turn, present the selling proposition to the claimant.

In some embodiments, claimants who have evidenced loyalty may be asked to permit the insurance company to send e-mail messages to the claimants' friends and family. The e-mail messages may inform the recipients of the claimant's positive experience with the insurance company, and may provide to the recipients, or invite the recipients to ask for, information concerning the insurance company's products.

The usefulness of the computer system 100 may be significantly enhanced by the above-noted practice of sound-recording and centrally storing the claimants' responses to the surveys. This may allow supervisors, claim handlers, sales employees and others to audibly reproduce the claimants' responses via their terminals. In this way, the insurance company employees may get a nuanced feeling for the claimants' wishes and attitudes by hearing the claimants' actual words and tone of voice. For this purpose, at least some of the terminals referred to herein may have audible sound reproduction capabilities.

The computer system 100, as described herein, may enable the insurance company to engender improved customer loyalty, and increased sales, by improving the insurance company's claim handling performance.

The database storage module 102 and/or the loyalty data server computer 206, as the case may be, may store data entered by the survey employees and data representing sound recordings of the surveys together in one database or in separate (e.g., linked) databases and/or in separate data storage devices.

As an alternative to conducting the interim and final surveys by telephone, either or both may be conducted by electronic mail (e.g., by providing the claimant with a link to a suitable webpage). In some embodiments, when a survey is conducted by electronic mail, the computer system 100 (e.g., the loyalty data server computer 206) may use artificial intelligence to interpret narrative responses from the claimants to determine whether the responses are positive, neutral or negative.

Up to this point, most if not all of the employees mentioned herein have been referred to as insurance company employees. Alternatively, however, the insurance company may contract out some of the activities described herein. For example, the insurance company may contract out the surveys, so that the "survey employees" may be employed by an outside vendor, and the survey terminals 106 (FIGS. 1 and 2) may be operated by the outside vendor.

In some embodiments, insurance company employees may also be surveyed concerning claim processes. For example, both claimants and claim handling employees may be surveyed as to performance of outside vendors retained by the insurance company. In some embodiments, the loyalty data server computer 206 (and/or the survey terminals 106) may include a capability for translating recorded voice files into text files. The resulting text files may be stored in the computer system 100 in association with the corresponding claim files, and may be made available to users of the computer system 100 in addition to or instead of the recorded voice files.

Each terminal referred to herein may, for example, be constituted by a conventional personal computer that is similar in its hardware aspects to the survey terminal described above with reference to FIG. 4.

As used herein and in the appended claims, the term "customer feedback response" refers to a response to a survey question administered by or on behalf of an insurance company.

As used herein and in the appended claims, the term "open claim file" refers to a claim file in which a notice of claim has been received, and for which the claim has not been resolved or closed.

As used herein and in the appended claims, prompting a survey employee to administer a survey may include placing a claim file in the survey employee's work queue or otherwise bringing the claim file to the employee's attention.

As used herein and in the appended claims, the term "dashboard display" refers to any computer-presented screen display that includes presentation of statistical information with a display element in a dial format.

The process descriptions and flow charts contained herein should not be considered to imply a fixed order for performing process steps. Rather, process steps may be performed in any order that is practicable.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A computer system, comprising:
    a multi-device interfacing computer system in communication with a claim data management server computer, the multi-device interfacing computer system operative to access the claim data management server computer to identify open claim files ripe for an interim survey, and, responsive to identifying an open claim file ripe for an interim survey, obtain a hyperlink pointing to the claim file location, in the claim data management server computer, and place the obtained hyperlink in a work queue on a first terminal;
    a data acquisition processor operative to:
        receive a plurality of first feedback responses and a plurality of second feedback responses to surveys, wherein:
            each of the first feedback responses is an interim claims transaction feedback response received, in response to a first survey, by the data acquisition processor from a claimant before the insurance claim is resolved, and
            each of the second feedback responses is received by the data acquisition processor after receiving the one of the plurality of first feedback responses associated with one of the insurance claims, and
        assign at least one of the first feedback responses to a first category corresponding to an indicated need for attention and at least one other of the first feedback responses to a second category corresponding to an absence of a need for attention;
    a router operative to route one of the plurality of claims to a second terminal in response to the first feedback response associated with the claim being classified in the first category,
        wherein the second feedback response associated with one of the claims is received responsive to a survey dispatched after the routing of the claim to the second terminal in response to the first feedback response associated with the one of the claims being classified in the first category; and
        wherein the data acquisition processor is further operative to classify the second feedback response as indicative of loyalty, and to classify a first feedback response in the second category as indicative of loyalty; and
    a sales processor in communication with the data acquisition processor and the router and, responsive to the classification of a feedback response as indicative of loyalty, configured to generate a selling proposition for the survey respondent who provided the feedback response.

2. The computer system of claim 1, wherein the second terminal is a supervisor terminal operative to facilitate remedial action before the second customer feedback response associated with the claim is received by the data acquisition processor.

3. The computer system of claim 1, wherein the multi-device interfacing computer system is configured to determine that an open claim is ripe for an interim survey based on passage of at least a minimum time period after a trigger event.

4. The computer system of claim 3, wherein the trigger event is a first notice of loss.

5. The computer system of claim 4, wherein the multi-device interfacing computer system is further operative to:
    responsive to the first notice of loss being associated with a first insurance type, automatically set the minimum time period to a first value, and
    responsive to the first notice of loss being associated with a second insurance type, automatically set the minimum time period to a second value different than the first value.

6. The computer system of claim 5, wherein the first insurance type is automobile insurance, and the second insurance type is workers compensation.

7. The computer system of claim 1, wherein the routing one of the plurality of claims to the second terminal comprises adding a hyperlink that points to the claim file location, in the claim data management server computer, to a work queue on the second terminal.

8. The computer system of claim 1, wherein the multi-device interfacing computer system is further operative to access the claim data management server computer to identify claim files eligible for a second survey.

9. The computer system of claim 8, wherein the multi-device interfacing computer system is operative to identify a claim file as eligible for a second survey responsive to at least one of: closing of the claim file; payment of the claim; subrogation, or lapse of a time period.

10. A computerized method, comprising:
   accessing, by a multi-device interfacing computer system, a claim data management server computer, open claim files ripe for an interim survey;
   responsive to identifying an open claim file ripe for an interim survey, by the multi-device interfacing computer system, obtain a hyperlink pointing to the claim file location, in the claim data management server computer, and place the obtained hyperlink in a work queue on a first terminal;
   receiving, by a data acquisition processor, a plurality of first feedback responses to surveys, each of the first feedback responses being an interim feedback response received, in response to a first survey, before the claim is resolved;
   receiving, by the data acquisition processor, a plurality of second feedback responses to surveys, each of the second feedback responses being received by the data acquisition processor after receiving the one of the plurality of first feedback responses associated with one of the claims;
   assigning, by the multi-device interfacing computer system, at least one of the first feedback responses to a first category corresponding to an indicated need for attention and at least one other of the first feedback responses to a second category corresponding to an absence of a need for attention;
   routing, by the multi-device interfacing computer system, one of the plurality of claims to a second terminal in response to the first feedback response associated with the claim being classified in the first category,
   classifying, by the multi-device interfacing computer system, the second feedback response as indicative of loyalty, and classifying a first feedback response in the second category as indicative of loyalty; and
   responsive to the classification of a feedback response as indicative of loyalty, generating, by a sales processor in communication with the multi-device interfacing computer system, a selling proposition for the survey respondent who provided the feedback response;
   wherein the second feedback response associated with one of the claims is received responsive to a survey dispatched after the routing of the claim to the second terminal in response to the first feedback response associated with the one of the claims being classified in the first category.

11. The computer-implemented method of claim 10, wherein the second terminal is a supervisor terminal, and the method further comprises facilitating remedial action, by the supervisor terminal, before the second customer feedback response associated with the claim is received by the data acquisition processor.

12. The computer-implemented method of claim 10, further comprising determining, by the multi-device interfacing computer system, that an open claim is ripe for an interim survey based on passage of at least a minimum time period after a trigger event.

13. The computer-implemented method of claim 12, wherein the trigger event is a first notice of loss.

14. The computer-implemented method of claim 13, further comprising:
   responsive to the first notice of loss being associated with a first insurance type, automatically setting the minimum time period to a first value, and
   responsive to the first notice of loss being associated with a second insurance type, automatically setting the minimum time period to a second value different than the first value.

15. The computer-implemented method of claim 14, wherein the first insurance type is automobile insurance, and the second insurance type is workers compensation.

16. The computer-implemented method of claim 10, wherein the routing one of the plurality of claims to the second terminal comprises adding a hyperlink that points to the claim file location, in the claim data management server computer, to a work queue on the second terminal.

17. The computer-implemented method of claim 10, further comprising accessing, by the multi-device interfacing computer system, the claim data management server computer, to identify claim files eligible for a second survey.

18. The computer-implemented method of claim 17, wherein the identifying claim files eligible for a second survey comprises identifying a claim file as eligible for a second survey responsive to at least one of: closing of the claim file; payment of the claim; subrogation, or lapse of a time period.

* * * * *